United States Patent [19]
Seitz

[11] Patent Number: 5,559,522
[45] Date of Patent: Sep. 24, 1996

[54] ANTENNA POSITIONING APPARATUS CAPABLE OF SUBSTANTIALLY VERTICAL ORIENTATION

[75] Inventor: Martin V. Seitz, Fox River Grove, Ill.

[73] Assignee: Motorola, Inc., Schaumburg, Ill.

[21] Appl. No.: 280,094

[22] Filed: Jul. 25, 1994

[51] Int. Cl.$^6$ ........................................... H01Q 1/24
[52] U.S. Cl. .......................................... 343/702; 343/882
[58] Field of Search ................................... 343/702, 906, 343/882; 455/89, 90, 347, 351

[56] References Cited

U.S. PATENT DOCUMENTS

| | | | |
|---|---|---|---|
| 3,435,456 | 3/1969 | Robb, Jr. ................................. | 343/702 |
| 5,218,370 | 6/1993 | Blaese .................................... | 343/702 |
| 5,281,970 | 1/1994 | Blaese .................................... | 343/702 |
| 5,523,766 | 6/1996 | Erceg ..................................... | 343/702 |

FOREIGN PATENT DOCUMENTS

| | | |
|---|---|---|
| 0611199A1 | 8/1994 | European Pat. Off. . |
| 0652646A1 | 5/1995 | European Pat. Off. . |
| 0147806 | 11/1980 | Japan ....................................... 343/702 |
| 61-100003 | 5/1986 | Japan . |
| 0179801 | 8/1991 | Japan ....................................... 343/702 |

OTHER PUBLICATIONS

Chicago Tribune, CellularOne ad, Jul. 11, 1994, p. 8.
Industry Week, "A 'Ma Bell' for the Space Age", Mar. 21, 1994, pp. 71–72.

Primary Examiner—Donald T. Hajec
Assistant Examiner—Tan Ho
Attorney, Agent, or Firm—Daniel W. Juffernbruch

[57] ABSTRACT

A radiotelephone, used in a satellite radiotelephone system, has an antenna (12) with a hemispherical gain pattern (14). Since a satellite (18) can be anywhere in the sky the antenna gain pattern (14) needs to be aligned with the hemisphere above the user. This is accomplished with an antenna positioning apparatus, comprising the antenna (12) having a wedge shaped mating surface (42) affixed to an attaching surface (36) by a pin (38) and socket (44). The attaching surface (36) slopes downward from a plane (24) defined by a front face (26) of the radiotelephone (10). The combination of the wedge shaped mating surface (42) and the downward sloping attaching surface (36) positions the antenna (12) at an angle $\phi$ from the plane (24) when the antenna is in the active position. As a result the antenna (12) is vertically oriented when held by the user during normal use.

19 Claims, 3 Drawing Sheets

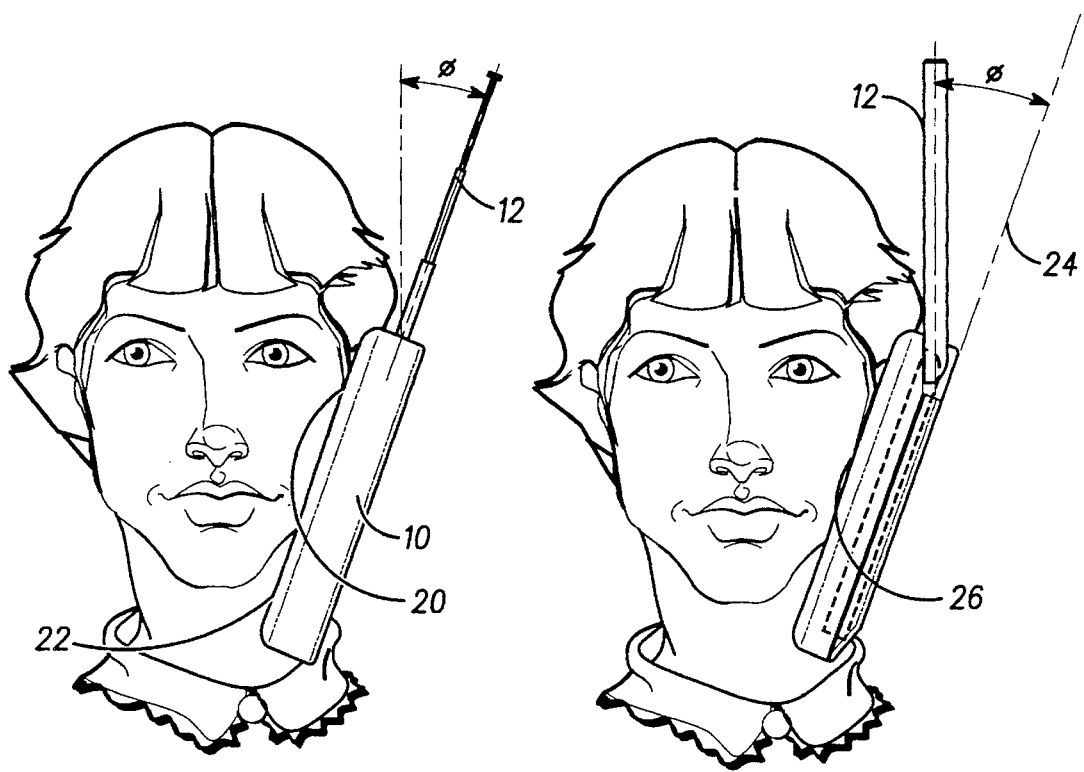
FIG.1
—PRIOR ART—
FIG.2
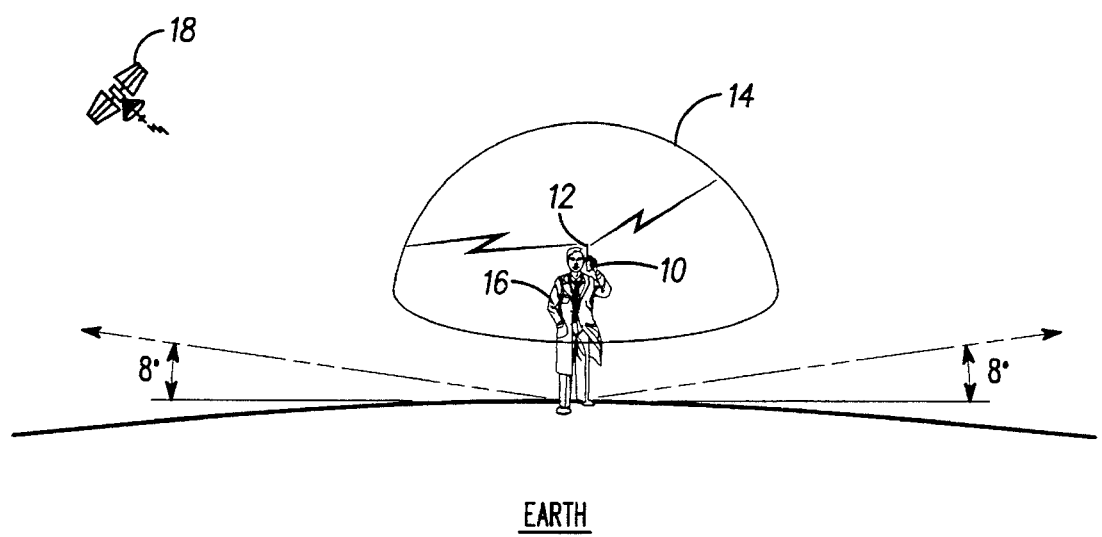
FIG.5

5,559,522

ANTENNA POSITIONING APPARATUS CAPABLE OF SUBSTANTIALLY VERTICAL ORIENTATION

FIELD OF THE INVENTION

This invention relates generally to the field of radiotelephones and more particularly to an apparatus for positioning an antenna attached to a radiotelephone.

BACKGROUND OF THE INVENTION

A cellular radiotelephone system consists of a number of base stations and radiotelephone handsets. The user receives and places radiotelephone calls through the handset, which is in radio communication with one of the base stations.

A satellite radio communication system, such as the Iridium system, has a network of satellites, in a low earth polar orbit, that perform the same function as the base stations. These satellites transmit and receive signals from a handset to form a radiotelephone system, allowing users to place radiotelephone calls from anywhere in the world to anywhere in the world.

Unlike cellular systems, the satellites do not remain in the same place with respect to the surface of the earth. Since the satellite could be anywhere in the hemisphere above the user, the radiotelephone's antenna needs to have a gain pattern that covers the hemisphere above the user. Thus, designers have developed an antenna with a hemispherical gain pattern.

A user wishing to place a radiotelephone call needs to have the antenna of the radiotelephone oriented to communicate with any of the possible low earth orbit satellites. As shown in FIG. 5, a radiotelephone handset 10 has an antenna 12 with a hemispherical gain pattern 14. If a user 16 tilts the radiotelephone 10 and therefore the antenna 12, the gain pattern 14 will no longer be aligned with the potential locations of a satellite 18 in the radiotelephone system.

The prior art antenna positioning systems, shown in FIG. 1, orient the antenna 12 in the same plane as the body of the radiotelephone 10. When the user places the radiotelephone's speaker 20 against his ear and the radiotelephone's microphone 22 up to his mouth the antenna 12 naturally tilts at an angle $\phi$ with respect to vertical. This is undesirable because it causes a rotation of the antenna gain pattern 14 which can result in the radiotelephone not being able to communicate with a satellite 18 near the horizon.

Thus there exists a need for an antenna positioning apparatus that orients the antenna in a vertical position during normal use.

BRIEF DESCRIPTION OF THE DRAWINGS

FIG. 1 is a sketch of a person holding a radiotelephone with a prior art antenna positioning apparatus;

FIG. 2 is a sketch of a person holding a radiotelephone with an antenna positioning apparatus of this application;

FIG. 5 is a sketch showing an antenna gain pattern for the type of antenna used with the antenna positioning apparatus of this application.

DETAILED DESCRIPTION OF THE DRAWINGS

Figure 3:
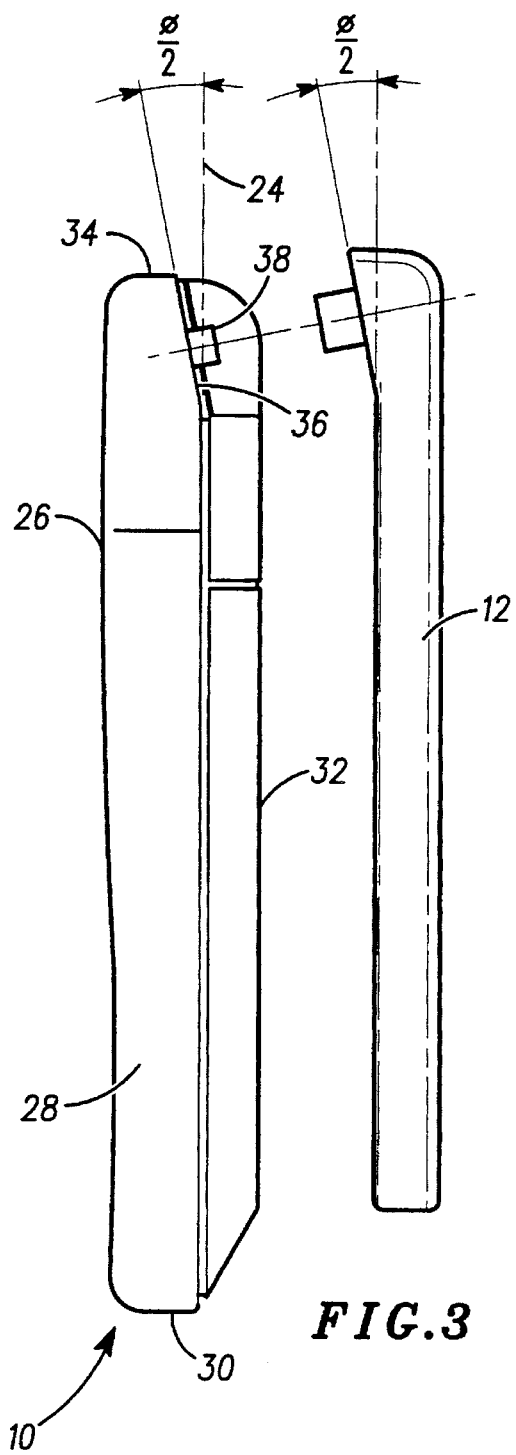
FIG. 3 is an exploded view of a radiotelephone with the antenna positioning apparatus of this application.

A solution to the antenna position problem requires an apparatus that locates the antenna 12 at an angle $\phi$ from a plane 24 defined by a front face 26 of the radiotelephone 10 (see FIG. 2). For a typical radiotelephone the angle $\phi$ is around 15 degrees. A mechanism for positioning the antenna 12 at an angle $\phi$ when in the active position is shown in FIG. 3. The radiotelephone 10 has the front face 26, two side surfaces 28, a bottom surface 30, a back surface 32 and a top surface 34. An attaching surface 36 defines a plane that intersects the plane 24, defined by the front face 26, at an angle $\phi/2$. A pin 38 is positioned on the attaching surface 36.

Figure 4:
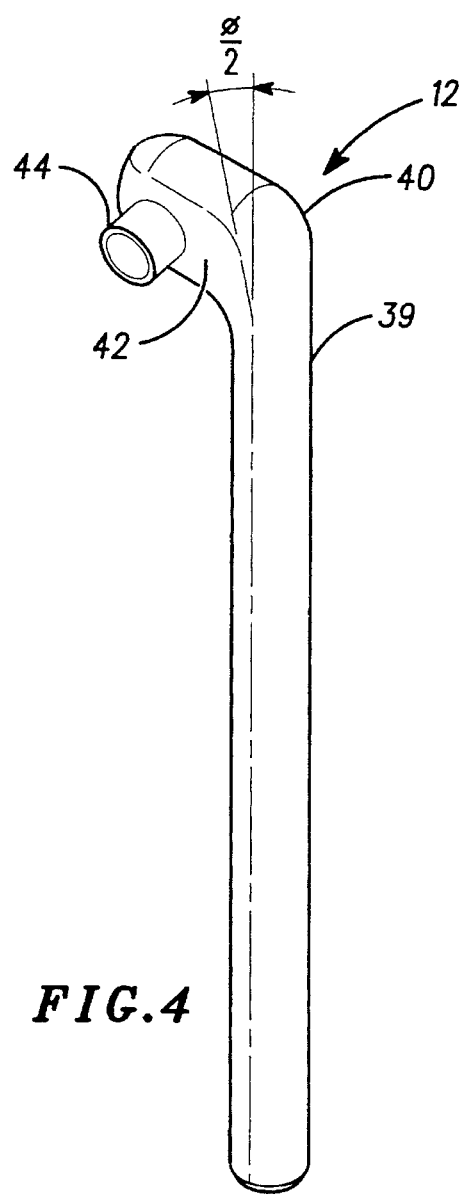
FIG. 4 is a perspective view of the antenna.

The antenna 12 at a proximal end 39 (see FIG. 4) is attached to an elbow 40, having a mating surface 42. The mating surface 42 faces the attaching surface 36 of the radiotelephone 10 when assembled. The mating surface 42 includes a socket 44 that engages the pin 38 when the antenna 12 is assembled to the radiotelephone 10. The antenna 12 pivots about the pin 38. The mating surface is at an angle $\phi/2$ with respect to the line formed by the antenna 12.

When the antenna 12 is in the stored position a distal end 46 is pointed towards the bottom surface 30 of the radiotelephone 10 and the length of the antenna 12 is along the side 28 of the radiotelephone 10. The antenna 12 is parallel to the plane 24, in the stored position, because the attaching surface makes a downward sloping angle of $\phi/2$ with the plane 24, while the mating surface 42 of the antenna 12 makes a upward sloping angle of $\phi/2$. As a result the two angles cancel each other out in the stored position and the antenna 12 is parallel to the plane 24 when in the stored position.

Figure 6:
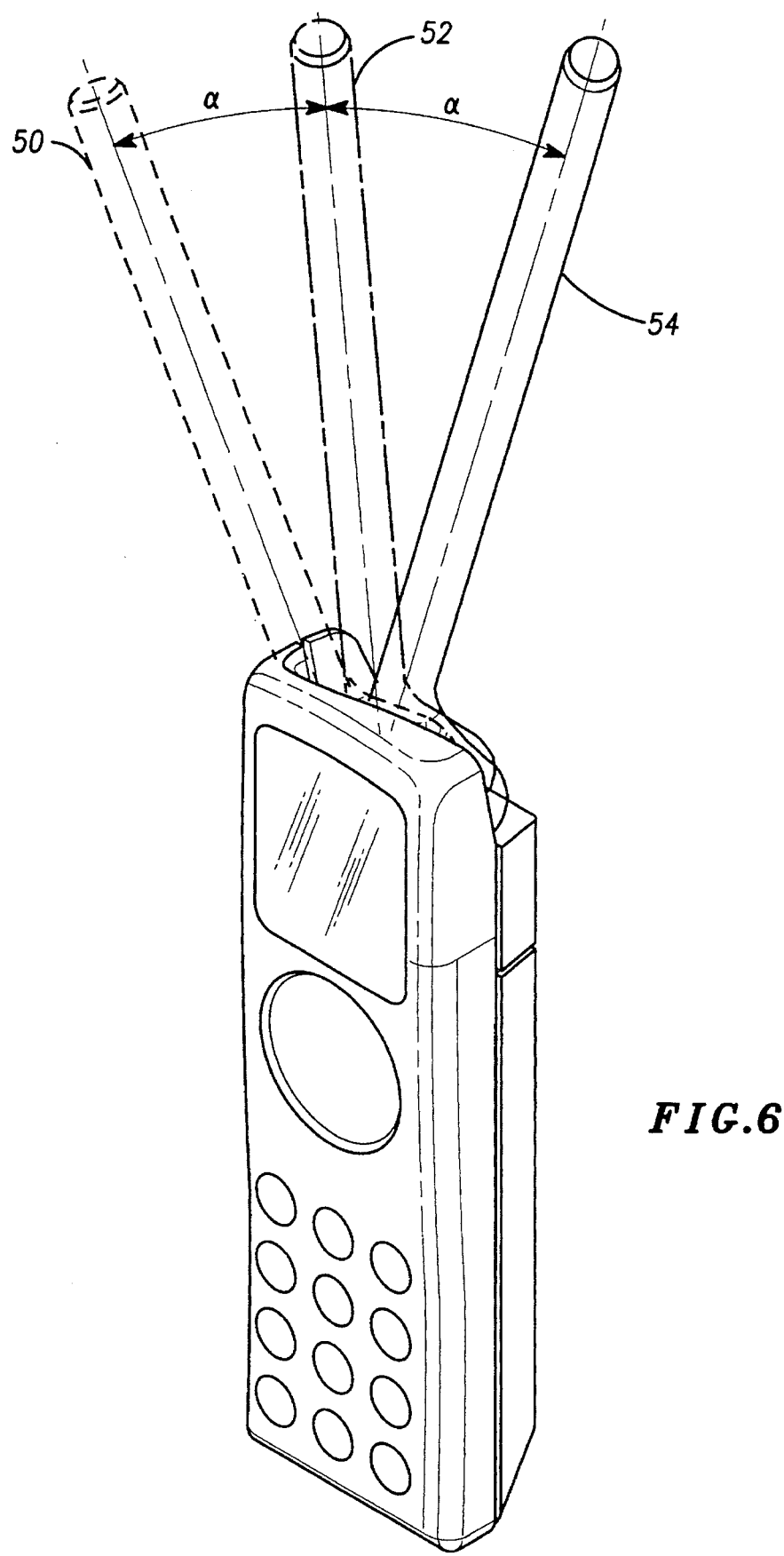
FIG. 6 is a perspective view of a radiotelephone with antenna positioning apparatus of this application.

From the stored position the antenna 12 is rotated to the active position in which the distal end 46 of the antenna 12 is above the top surface 34 of the radiotelephone 10. A further improvement provides three detent positions 50, 52, 54 when in the active position, as shown in FIG. 6. A second position 52 corresponds to a 180 degree rotation from the stored position. While a first position corresponds to a 180+$\alpha$ degree rotation and a third position 54 corresponds to a 180–$\alpha$ degree rotation. The first position 50 is designed for a right handed user and the angle $\alpha$ compensates for the angle that the phone tilts back when in use by a right handed user. While the third position 54 will compensate for the tilt normally experience by a left handed user.

In a satellite radiotelephone systems it is vital that the antenna gain pattern cover the hemisphere above the user, to provide optimal service. A normal user will hold a radiotelephone so that the top of the radiotelephone points away from the top of his head and towards the back of his head. Prior art antenna attaching designs will match the orientation of the antenna to the orientation of the phone. As a result the antenna will not be in a vertical orientation and the antenna gain pattern will not cover the hemisphere above the user. The invention of this application provides a simple, low cost mechanism to orient the antenna in a vertical orientation during normal use. Thus providing the user with improved radiotelephone communication performance.

To those skilled in the art it is obvious that many modifications can be made to the invention without departing from the spirit of the invention. For instance, a cam device could be used instead of a pivot to guide the antenna to the desired location, or a universal joint with a guiding slot could used instead of the pivot and sloping planes. Any such modification is considered to be part of the inventor's exclusive rights in this invention. For a full understanding of the scope of the invention reference should be made to the appended claims.

I claim:

1. An antenna positioning apparatus in a portable communication device, the communication device having a front surface, a top surface, a bottom surface, and two side surfaces essentially describing a rectangular box, the antenna positioning apparatus comprising:

a wedge connected to a proximal end of an antenna, the wedge having a angle of inclination;

a planar attaching surface near the top surface of the communication device, intersecting the plane formed by the front surface of the communication device at an intersection angle;

said wedge and the antenna pivotally connected to the attaching surface, the antenna pivoting from a first position, in which a distal end of the antenna is near the bottom surface of the communication device, next to one side of the communication device and parallel to the plane formed by the front surface of the communication device, to a second position, in which the distal end of the antenna is above the top surface of the communication device and the antenna is not parallel to the plane formed by the front surface of the communication device.

2. The antenna positioning apparatus of claim 1, wherein the angle of inclination is equal to the angle of intersection.

3. The antenna positioning apparatus of claim 1, wherein the gain pattern of the antenna is hemispherical.

4. The antenna positioning apparatus of claim 1, wherein the antenna in the second position forms a second angle of intersection with a plane defined by the side surfaces of the communication device.

5. The antenna positioning apparatus of claim 1, wherein the antenna has at least two detent positions when the distal end of the antenna is above the top surface of the communication device, a first position forming a first angle with a plane defined by the side surfaces of the communication device, the second position forming a second angle with the plane defined by the side surfaces of the communication device, and the third position forming a third angle with the plane defined by the side surfaces of the communication device.

6. The antenna positioning apparatus of claim 5, wherein the first angle is an acute angle with respect to a right side surface of the communication device, the third angle is an acute angle with respect to a left side surface of the communication device and the second angle is zero degrees.

7. An antenna positioning apparatus comprising:

an antenna having a proximal end and a distal end, the antenna having an elongated tubular shape;

a portable communication device designed to be held in a user's hand, having an earpiece directed at a front surface, near a top end of the communication device and a microphone directed at the front surface, near a bottom end of the communication device;

a pivoting mechanism connecting the proximal end of the antenna to the communication device, near the top end, said antenna able to pivot along a predetermined path from a discrete stored position to adjacent to a surface of said device, an active position, in which the distal end of the antenna is above the top end of the communication device and, when the earpiece and the microphone of the front surface are held by a typical user at any of plurality of non-vertical angles near the user's ear and mouth for normal use, a line formed by the antenna remains substantially vertical.

8. The antenna positioning apparatus of claim 7, wherein the antenna has a plurality of predetermined active positions including a predetermined active position for a right handed predetermined position for a left handed user.

9. The antenna positioning apparatus of claim 8, wherein the antenna has at least two detent positions corresponding to the predetermined positions for the right handed user and for the left handed user when the distal end of the antenna is above the top end of the communication device.

10. The antenna positioning apparatus of claim 8, wherein the antenna continuously pivots along the predetermined path in a serial succession among the stored position, the predetermined active position for a right handed user and the predetermined active position for a left handed user; and wherein said antenna positioning device includes at least one detent at one of said predetermined active positions between the stored position and another of the predetermined active positions.

11. The antenna positioning apparatus of claim 7, wherein the active position includes a position in which the antenna is essentially vertical when a right handed user holds the communication device so the earpiece is near the user's ear and the microphone is near the user's mouth.

12. The antenna positioning apparatus of claim 7, wherein the active position includes a position in which the antenna is essentially vertical when a left handed user holds the communication device so the earpiece is near the user's ear and the microphone is near the user's mouth.

13. The antenna positioning apparatus of claim 7, wherein the communication device is a satellite telephone handset.

14. The antenna positioning apparatus of claim 13, wherein the antenna gain pattern is hemispherical.

15. The antenna positioning apparatus of claim 7, wherein the pivoting mechanism pivots the antenna about an axis inclined at an angle with respect to the front surface of the portable communication device.

16. The antenna positioning apparatus of claim 7, wherein said antenna comprises a first pivot portion inclined at a first angle with respect to a line perpendicular to the elongated tubular shape of the antenna; and wherein said pivoting mechanism comprises a second pivot portion corresponding to the first pivot portion and inclined at a second angle with respect to a line perpendicular to a surface of the portable communication device such that at the stored portion the first and second angles subtract and in the active position the first and second angles add.

17. The antenna positioning apparatus of claim 16, wherein the first and second angles are the same and cancel each other in the stored position.

18. The antenna positioning apparatus of claim 17, wherein the second angle is inclined with respect to a line perpendicular to the front surface of the portable communication device.

19. The antenna positioning apparatus according to claim 7, wherein the pivoting mechanism is able to pivot from a stored position, in which the distal end of the antenna is near the bottom end of the communication device, next to one side of the communication device and substantially parallel to the planes formed by surfaces of the communication device to the at least one active position.

* * * * *

UNITED STATES PATENT AND TRADEMARK OFFICE
CERTIFICATE OF CORRECTION

PATENT NO. : 5,559,522
DATED : September 24, 1996
INVENTOR(S) : Seitz, Martin V.

It is certified that error appears in the above-indentified patent and that said Letters Patent is hereby corrected as shown below:

Claim 7

In column 3, line 61, after "position", please delete "to".

In column 3, line 62, please insert --to-- before the phrase "an active position".

In column 3, line 66, please insert --a-- before "plurality".

Claim 8

In column 4, line 5, please insert --user and a-- after "right handed".

Signed and Sealed this

Fifteenth Day of July, 1997

Attest:

Attesting Officer

BRUCE LEHMAN

Commissioner of Patents and Trademarks